United States Patent [19] [11] Patent Number: 4,800,496
Barber et al. [45] Date of Patent: Jan. 24, 1989

[54] METHOD FOR DETERMINING INDUCTION SONDE ERROR

[75] Inventors: Thomas D. Barber; William B. Vandermeer; William D. Flanagan, all of Houston, Tex.

[73] Assignee: Schlumberger Technology Corporation, Houston, Tex.

[21] Appl. No.: 101,616

[22] Filed: Sep. 28, 1987

[51] Int. Cl.$^4$ .............................................. G01V 3/18
[52] U.S. Cl. ..................................... 364/422; 324/337
[58] Field of Search ............... 364/422; 324/339, 329, 324/233, 239

[56] References Cited

U.S. PATENT DOCUMENTS

| 4,439,831 | 3/1984 | Sinclair | 364/222 |
| 4,467,425 | 8/1984 | Schaefer et al. | 364/222 |
| 4,471,436 | 9/1984 | Schaefer et al. | 364/222 |
| 4,499,422 | 2/1985 | Sinclair | 364/222 |
| 4,513,376 | 4/1985 | Barber | 364/222 |
| 4,651,101 | 3/1987 | Barber et al. | 324/339 |
| 4,720,861 | 1/1988 | Sinclair | 324/339 |

Primary Examiner—A. D. Pellinen
Assistant Examiner—Jeffrey A. Gaffin
Attorney, Agent, or Firm—Henry N. Garrana; John H. Bouchard

[57] ABSTRACT

A method for determining a sonde error characteristic of an induction tool is disclosed. The method includes the step of measuring an electrical characteristic which may be the real or quadrature component of conductivity, at two or more different heights above the earth. The sonde error characteristic is determined as a function of a predetermined relationship between the desired sonde error characteristic and the measurements of that characteristic at two or more different heights above the earth. The method may be performed with the tool disposed substantially parallel to the earth. Alternatively, the tool may be disposed substantially perpendicularly to the earth.

19 Claims, 4 Drawing Sheets

U.S. Patent   Jan. 24, 1989   Sheet 2 of 4   4,800,496
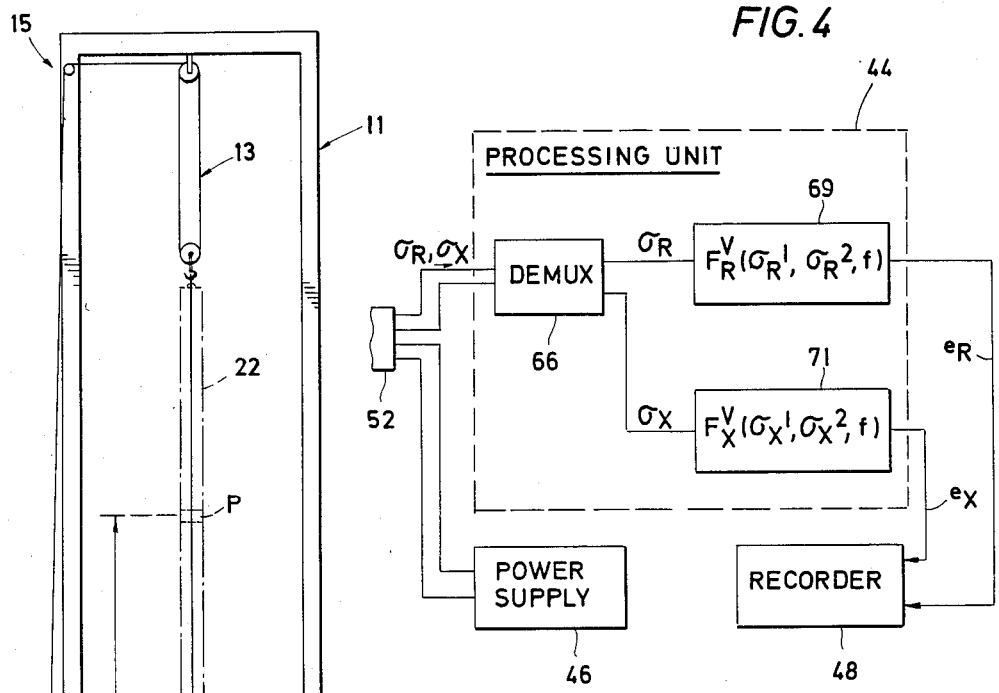
FIG. 4
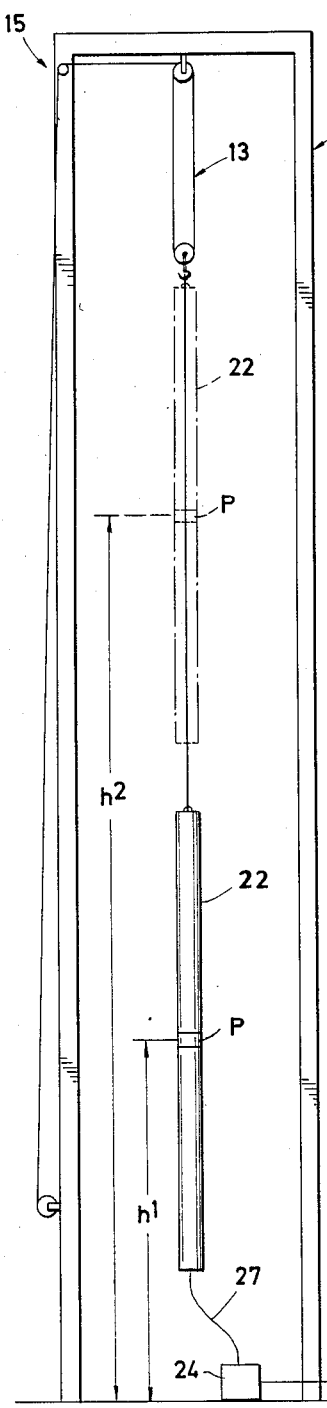
FIG. 3
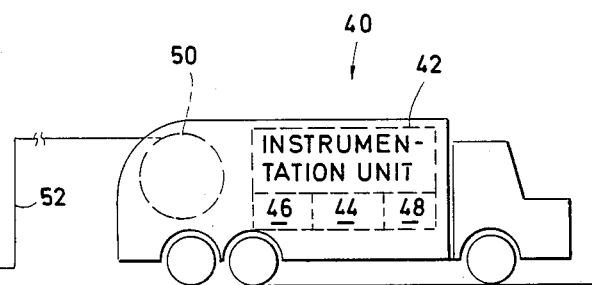

METHOD FOR DETERMINING INDUCTION SONDE ERROR

BACKGROUND OF THE INVENTION

1. Field of the Invention

This invention relates generally to the field of electric well logging. More particularly the invention relates to induction logging. Still more particularly the invention relates to a method for determining sonde error which is the signal an induction tool measures when the tool is placed in a zero-conductivity medium.

2. Description of Prior Art

Ideally an induction logging tool should read zero in a zero-conductivity medium. However, conductive material used in the sonde construction, (such as sonde wiring, quadraxes, bulkheads, electrodes for spherical focused logs mounted on the induction sonde, etc.) produce a non-zero sonde error signal. Certain new induction sondes measure not only the real or "R" conductivity signal (the ratio of the signal from the receiver coil array which is one hundred eighty degrees out-of-phase with the transmitter array current), but also the quadrature or "X" conductivity signal (the ratio of the signal from the receiver coil array which is ninety degrees out-of-phase with the transmitter array current.) In the case of the X signal, the unbalanced mutual from the transmitter is also a major contributor to sonde error.

Once the sonde error for a particular logging tool to be used in well logging operations has been determined, it is subtracted from the raw tool response during logging, or in processing raw tool data in a computerized instrumentation unit to correct the raw tool data for the sonde error signal.

Accurate determination of induction sonde errors has historically been a difficult and inexact art. Some field engineers have attempted to determine sonde error while the induction tool is downhole. But such a procedure inherently corrects for borehole signal and shoulder effect at a particular point in the borehole and may produce erroneous measurements at different locations in the borehole. Other operating well-logging field engineers have measured sonde errors with the induction tool dangling from a tall pole or support structure. In other words, the transmitter coil is energized, the voltage from the receiver coil array is measured and the conductivity reading of the tool is determined while it is dangling from the pole and is defined as the apparent error. The major obstacle with this prior art method and others, has been in accurately determining the background signal which is the signal from conductive surroundings about which the measurement is taken. The background signal, usually "estimated" by field engineers, must be subtracted from the apparent sonde error in order to determine the "true" sonde error connection.

There has been no uniform method in field operations for determining background signals. In addition, background signals are subject to change, because background signal depends on whether the earth under the tool during the sonde error determination is wet or dry and upon the presence or absence of metallic objects, such as cars, trucks, buildings, etc., in the vicinity of the tool during the measurement.

Compounding the sonde error determination problem is the requirement of certain new induction logging tools which not only measure the real conductivity signal, but also the quadrature conductivity signal and does so at multiple frequencies. Such a tool is described in U.S. Pat. Nos. 4,471,436, 4,513,376, and 4,467,425, which are assigned to the assignee of this invention. The sonde error of such a tool must be determined for each real and quadrature conductivity component at each operating frequency for which such components are determined.

Identificatino and Objects of the Invention

It is an object of the invention to provide a method for determining induction sonde errors uphole so as to eliminate inherent errors in determining sonde errors downhole.

Another object of the invention is to provide a sonde error measurement method for an induction logging tool in which background signals are determined for each sonde error measurement.

It is a further object of the invention to provide a sonde error measurement method whereby both real and quadrature conductivity sonde errors may be determined.

It is a still further object of the invention to provide a sonde error measurement method whereby two simple measurements with the induction logging tool may be made for accurate determination through a predetermined relationship of background signal and sonde error.

It is another object of the invention to provide accurate determination of induction logging sonde error at a field location regardless of whether the earth is wet (conductive) or dry (relatively non conductive).

SUMMARY OF THE INVENTION

The objects identified above as well as other advantages and features of the invention are provided with two alternative measurement methods. The methods do not rely on any previous knowledge of the background signal. Measurements are made with the tool at two different heights. In one method, the induction tool is parallel or horizontal to the ground. With the alternative method, the induction sonde of the induction tool is vertical with respect to the earth.

The difference in the measurements at two different heights (either the horizontal or vertical method) is used to determine the background signal for one of the measurements, preferably the upper measurement. The background signal is subtracted from the upper measurement to generate the corrected or "true" sonde error.

The methods depend, in a preferred embodiment, on precomputed models of the response of an induction sonde in air (zero conductivity) over conductive earth. The response of a particular induction tool at two separate measurement heights (for both the horizontal and vertical methods) is calculated for a wide range of earth conductivity. In a graphical embodiment of the method, the induction response from the upper calculation is plotted versus the difference between the lower and upper conductivities. The difference is plotted on the x-axis and the upper response is plotted on the y-axis. The resulting curve plotted on the y-x grid represents the correction curve for sonde error determination. The method may be performed by differencing the responses from the two heights and entering that difference on x-axis of the x-y graph and determining the background signal or "earth signal" from the corresponding point from the correction curve on the y-axis. The "true" sonde error signal is then found by subtracting the background signal from the upper measurement signal. The sonde error correction, during logging operations in a borehole, is the negative of the "true sonde error".

The method applies not only to conventional induction logging tools and sondes but also to modern induction logging tools and sondes which measure not only "real" conductivity but also quadrature conductivity. The method further applies to the measurement of such conductivity components at several individual frequencies.

BRIEF DESCRIPTION OF THE DRAWINGS

The invention is illustrated in the accompanying drawings, in which:

FIG. 3 is an illustration of the method of the invention in which measurements from an induction logging tool placed vertically or substantially perpendicularly to the earth are applied to a surface instrumentation unit for measuring apparent sonde error and ultimately true sonde error;

FIG. 4 represents the processing unit determination of true sonde errors of the real and quadrature conductivities from two different vertical height measurements;

DESCRIPTION OF THE INVENTION

Figure 1:
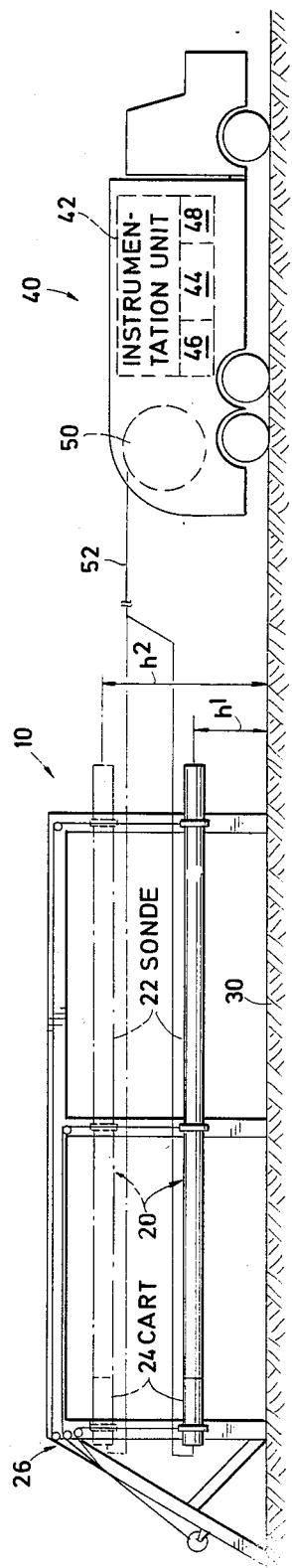
FIG. 1 is an illustration of the method of the invention in which measurements from an induction logging tool placed horizontally or substantially parallel to the earth, are applied to a surface instrumentation unit for measuring apparent sonde error and ultimately true sonde error.

FIG. 1 illustrates a horizontal or "parallel" sonde error facility 10 with which induction logging tool 20 may be placed substantially horizontal to the earth 30. The facility should have a minimum amount of metal or conductive material in the vicinity of the tool 20. It should be constructed with wooden posts and wooden dowels where possible, especially from the center post and to the right of the center post. Stainless steel bolts, nuts, and washers may be used elsewhere. The rope pulley system 26 is used to bring the tool 20, logging sonde 22 and cartridge 24 to a first height $h^1$ and subsequently to height $h^2$ as illustrated. The cartridge 24 includes, for simplicity of illustration, both an electronic cartridge and telemetry cartridge of a usual induction logging tool.

A mobile instrumentation and control unit 40 is provided in proximity with facility 10. An instrumentation unit 42 comprising a processing unit 44, power supply 46 and recorder 48 is provided as standard equipment in the well logging art. A logging cable 52 connects induction logging tool 20 via logging winch 50 to instrumentation unit 40.

Figure 2:
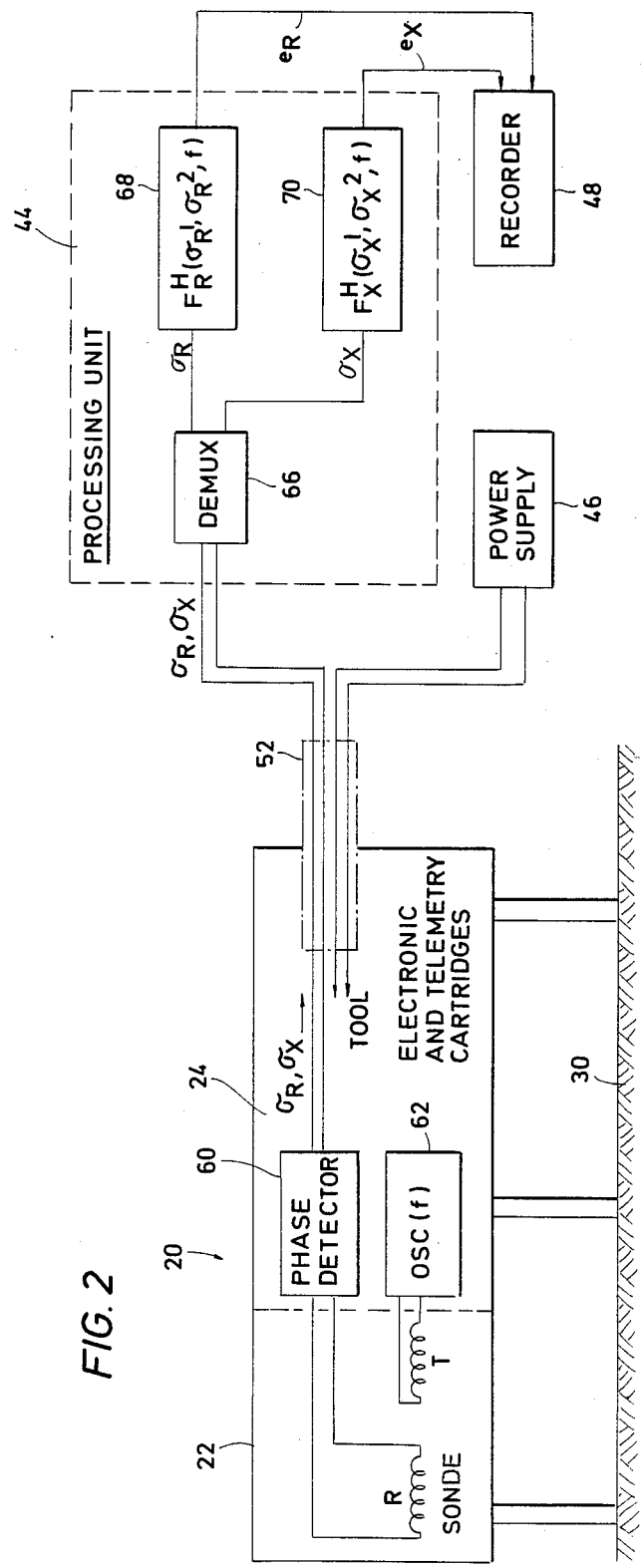
FIG. 2 is an illustration of an induction logging tool having a transmitter and a receiver, with means for measuring real and quadrature conductivities, and a processing unit by which true sonde errors of the real and quadrature conductivities may be determined.

FIG. 2 illustrates schematically the induction logging tool 20 disposed horizontally or substantially parallel to the earth 30 during the method of determining its true sonde error while in the presence of background error resulting from the conductivity of the earth. The tool 20 includes a sonde 22 (for purposes of illustration, a simple two-coil sonde is shown.) The cartridge 24 includes a phase sensitivity detector 60 which responds to signals from the transmitter oscillator 62 and the receiver signals from receiver R to generate an in-phase or "real" conductivity component $\sigma_R$, and a "quadrature" conductivity component, $\sigma_x$. One such tool which obtains very accurate measurements of real and quadrature conductivity components is disclosed in U.S. Pat. No. 4,467,425, incorporated herein for all purposes. Although a logging tool which generates both an in-phase or real conductivity component and a quadrature or ninety degrees out-of-phase conductivity component is shown, a tool which generates only an in-phase measurement may also be used to determine true sonde error according to the methods described below.

Still referring to FIG. 2, a processing unit 44 for processing the induction measurements by tool 20 is shown. A demultiplexer or "demux" 66 separates the two components $\sigma_R, \sigma_x$ of conductivity from the tool 20. The measurements of real conductivity $\sigma_R$ measured at heights $h^1$ and $h^2$ in facility 10 are applied to a functional processor 68 to generate an error signal $e_R$ for recording on log recorder 48. Likewise, the measurements of quadrature conductivity $\sigma_x$ measured at heights $h^1$ and $h^2$ in facility 10 are applied to a functional processor 70 to generate an error signal $e_x$ for recording on log recorder 48. Power supply 46 provides power to tool 20 via cable 52 as will be apparent to those of skill in the logging equipment art.

Turning now to the details of the horizontal method of the invention, as illustrated in FIGS. 1 and 2, the logging tool 20 including sonde 22 and electronic and telemetry cartridges 24 are connected to instrumentation unit 42 via logging cable 52. All metal tool stands, thread protectors, vehicles, etc. are removed from the vicinity of facility 10. After the tool is set for measurement under control of instrumentation unit 42, the tool is positioned to a height $h^1$, preferably four (4) feet above ground level.

The sonde should be parallel to the earth, not necessarily perpendicular to the vertical. Care should be taken that the height $h^1$, e.g. 4 feet, is measured from the center-line of the tool. The height of the tool is controlled with rope and pulley system 26. The conductivity components $\sigma_R^1$ at height $h^1$ (4 feet) and $\sigma_x^1$ at height $h^1$ (4 feet) are recorded in temporary storage (not illustrated) of processing unit 44.

Next, the tool is positioned at height $h^2$, preferably eight (8) feet above to the earth. The conductivity components $\sigma_R{}^2$ at height $h^2$ (8 feet) and $\sigma_x{}^2$ at height $h^2$ (8 feet) are recorded in temporary storage of processing unit 44.

Figure 5:
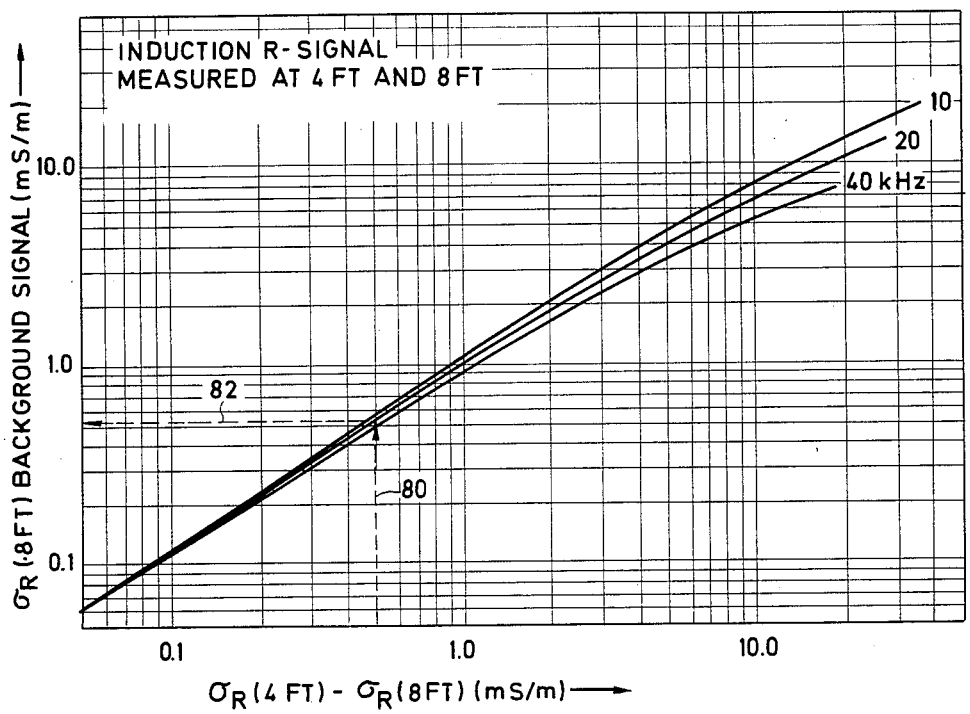
FIG. 5 is a two position horizontal measurement method graph for determining a real conductivity background signal as a function of the difference between the apparent real conductivity signals at two different heights.
Figure 6:
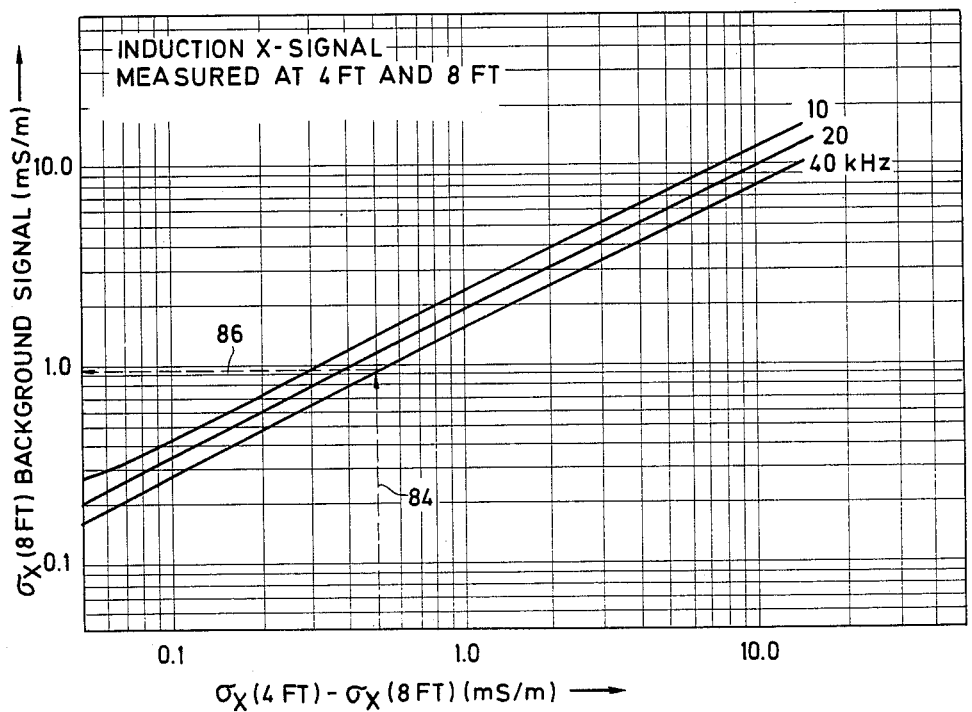
FIG. 6 is a two position horizontal measurement method graph for determining a quadrature conductivity background signal as a function of the difference between the apparent quadrature conductivity signals at two different heights.

The values of $\sigma_R{}^1$, $\sigma_R{}^2$ and $\sigma_x{}^1$, $\sigma_x{}^2$ at the measurement frequency of oscillator 62 may be processed digitally in processing units 68 and 70, or equivalently be used in connection with background correction charts illustrated in FIGS. 5 and 6.

FIGS. 5 and 6 result from the calculated response of sonde 20 at heights $h^1 = 4$ feet and $h^2 = 8$ feet for the horizontal measurement method for a wide range of earth conductivities. The induction response from the upper calculation is plotted versus the difference between the lower (4 feet) and upper (8 feet) calculation. The x-axis represents the difference variable; the y-axis represents the calculated background from the upper measurement variable. The resulting plot is the correction curve for sonde error determination. Different curves result from calculations where the sonde is operating at different frequencies, e.g., 10, 20 and 40 kHz. By measuring the difference in response of the tool 20 at two heights for which the correction curve is calculated (e.g. 8 feet and 4 feet), the earth signal (i.e. background signal) at the upper height can be determined. The true sonde conductivity component error is then determined by subtracting this background signal from the corresponding signal measured at the upper height. The true sonde error is then subtracted from actual borehole logging measurements to produce a sonde error corrected borehole log.

Figure 7:
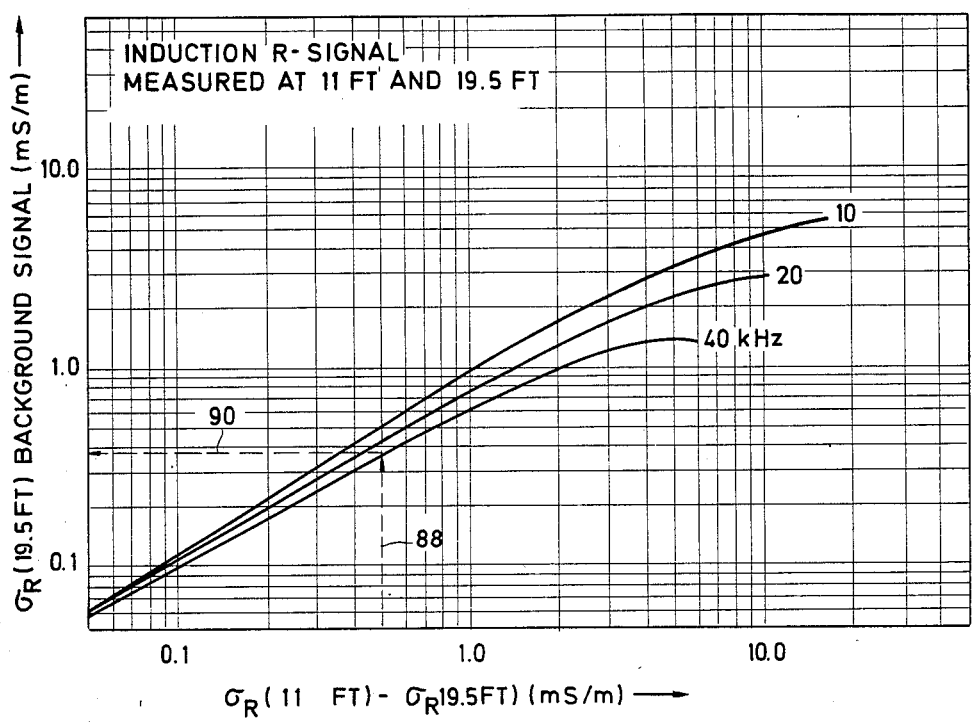
FIG. 7 is a two position vertical measurement method graph for determining a real conductivity background signal as a function of the difference between the apparent real conductivity signals at two different heights.
Figure 8:
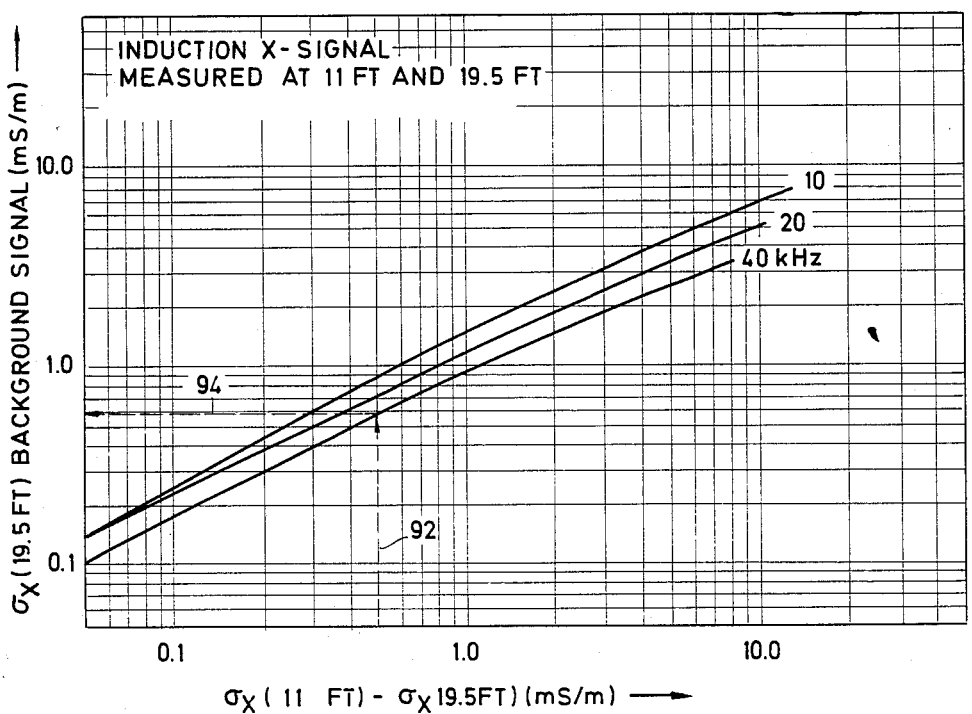
FIG. 8 is a two position vertical measurement method graph for determining a quadrature conductivity background original as a function of the difference between the apparent quadrature conductivity signals at two different heights.

An example of the determination of the background signal inherent in the measurement of $\sigma_R$ at the upper position is shown in FIG. 5 (and similarly for the background signals determinable from FIGS. 6-8). The arrow 80 indicates that if the difference between $\sigma_R$ (4 feet) and $\sigma_R$ (8 feet) is 0.5 m s/m and the frequency at which the measurement is conducted is 40 kHz, then arrow 82 is followed indicating that the $\sigma_R$ (8 ft) background signal is slightly greater than 0.5 m s/m. Similarly from FIG. 6 if $\sigma_x$ (4 ft)-$\sigma_x$ (8 ft) is 0.5 m s/m, then arrows 84 and 86 indicate that the $\sigma_x$ (8 ft) background signal is slightly greater than 0.9 m s/m. The true sonde error for the component (either real or quadrature) is determined by subtracting the background signal as determined from FIGS. 5 or 6 from the conductivity component as measured at the upper position (e.g. eight feet).

As indicated in FIG. 2, the method of determining the background component of the conductivity being measured may be automated. The equations which follow may be programmed in processor 44 to establish a computerized implementation of the result obtained from the graphical procedure of FIGS. 5 and 6. The equations follow:

$e_R$ or $e_x$ = TSE = "True" sonde error
$\sigma_R{}^2$ or $\sigma_x{}^2$ = USE = Upper sonde error (8 ft)
$\sigma_R{}^1$ or $\sigma_x{}^1$ = LSE = Lower sonde error (4 ft)
delta = LSE − USE
$x = \ln$ (delta)
$y = a(o) + a(1) \cdot x + a(2) \cdot x^2 + \ldots + a(7) \cdot x^7$
Background = $e^y$
TSE = USE − Background.

The coefficients $a(o) \ldots a(7)$ may be calculated dependent on the induction tool which is to be field evaluated for true sonde error, on the conductivity component being evaluated (real or quadrature conductivity) and the frequency of the measurement.

It should also be emphasized that more than one transmitter-receiver combination are often disposed on a common mandrel with modern induction logging sondes. A deep reading transmitter-receiver array and a medium reading transmitter-receiver array may be in one sonde. Consequently the equation presented above will have different coefficients depending on the transmitter-receiver array being evaluated. The graphical expression of the curves, i.e., background plotted against delta for a particular transmitter-receiver array component of conductivity being measured, and frequency may be presented. The correction curves of FIGS. 5 and 6 are developed for deep reading transmitter-receiver arrays.

FIGS. 3 and 4 in combination with graphical correction curves of FIG. 7 and 8 illustrate the two height vertical sonde error measurement method of the invention. A vertical facility comprises vertical poles and a cross beam which support block and tackle 13 controlled by rope and pulley system 15. The sonde is supported at an upper height ($h^2$) of 19.5 feet from the earth and at a lower height ($h^1$) of 11 feet. The vertical sonde error measurement method is preferably conducted with the electronics and telemetry cartridges 24 on the ground about seven to ten feet from the axis of the sonde 22. FIG. 3 illustrates the cartridges 24 offset horizontally from the axis of sonde 22, but in practice it may, for example, be offset the required distance in the plane perpendicular to the frame 11 through the axis of the sonde 26. It should also be apparent that the upper and lower heights are measured to the measure point P of sonde 22. The cartridges 24 additionally are connected to processing unit 44 (shown in FIG. 4) by cable 52 in a manner similar to FIG. 2.

The vertical sonde error measurement method follows a similar procedure to that described above for the horizontal sonde error measurement method. The determination of the background signal at the upper height may be determined as above by using precomputed correction graphs of FIGS. 7 and 8 or may be automatically computed in processing unit 44 with programmed modules 69 and 71.

If the correction graphs of FIGS. 7 and 8 are used, the measured conductivity component at the 19.5 feet height is subtracted from the measured conductivity component at the 11 feet height. The difference is entered on the x axis—for example at the arrows designated 88 and 92 of FIGS. 7 and 8 respectively and the background signals for the upper measurement at 19.5 feet are determined as indicated by arrows 90 and 94. The true sonde error is then determined, whether it is the real conductivity component or the quadrature conductivity component, by subtracting the determined background signal at the upper height from the measured component of conductivity at the upper height. The true sonde error is then recorded on recorder 48 for subsequent correction of borehole logging measurements of real and quadrature conductivity measurements.

Alternatively, correction equations may be stored in processors 69 and 71 to automatically determine true sonde errors for various conductivity component measurements. The background signals for the vertical sonde error measurement may be calculated according to the equations below.

$e_R$ or $e_x$ = TSE = "True" sonde error $\sigma_R{}^2$ or $\sigma_x{}^2$ = USE = Upper sonde error (19.5 ft)
$\sigma_R{}^1$ or $\sigma_x{}^1$ = LSE = Lower sonde error (11 ft)
delta = LSE − USE
$x = \ln$ (delta)
$y = a(o) + a(1) \cdot x + a(2) \cdot x^2 + \ldots + a(8) \cdot x^8$
Background = $e^y$
TSE = USE − Background.

As before, the coefficients $a(o) \ldots a(8)$ are separately calculated for the various conductivity components, deep or medium reading transmitter arrays and frequencies.

Various modifications and alterations in the described methods will be apparent to those skilled in the art of the foregoing description which does not depart from the spirit of the invention. For example, as will be apparent to those of skill in the induction logging art, the method described above may be extended to measuring sonde error at more than two heights from the earth. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. A method for determining a sonde error characteristic of an induction logging tool comprising the steps of
   measuring an electrical characteristic with said logging tool from at least at two different heights above the earth, and
   determining said sonde error characteristic as a function of a predetermined relationship between said sonde error characteristic and said measurements of said electrical characteristic at said different heights above the earth.

2. The method of claim 1 wherein said measuring step is conducted with said logging tool disposed above the earth in a region substantially free of metallic objects.

3. The method of claim 1 wherein said induction logging tool has a transmitter and a receiver and said electrical characteristic is
   conductivity proportional to the ratio of receiver voltage to transmitter current where said voltage is one hundred eighty degrees out-of-phase with transmitter current.

4. The method of claim 1 wherein said induction logging tool has a transmitter and a receiver and said electrical characteristic is quadrature conductivity proportional to the ratio of receiver voltage to transmitter current where said voltage is ninety degrees out-of-phase with transmitter current.

5. The method of claim 1 wherein said predetermined relationship between said sonde error characteristic and said measurements of said electrical characteristic is equal to the electrical characteristic measured at one of said heights above the earth minus a background characteristic determined from a predetermined function of the difference of said electrical characteristic of said logging tool.

6. The method of claim 1 wherein said measuring step is conducted with said induction logging tool disposed substantially parallel to the earth.

7. The method of claim 1 wherein said measuring step is conducted with said induction logging tool disposed substantially perpendicularly to the earth.

8. A method for determining a sonde error signal component of an induction logging tool having a transmitter and a receiver, comprising the steps of
   generating a first signal component of the receiver relative to a transmitter signal while said logging tool is positioned at a first height above the earth,
   generating a second signal component of the receiver relative to a transmitter signal while said logging tool is positioned at a second height above the earth,
   determining a difference signal component by subtracting said second signal component from said first signal component,
   applying said difference signal component to a digital computing machine in which is stored a predetermined relationship between a sonde background signal component at said second height and said difference signal component to generate a background signal component of said induction logging tool while at said second height, and
   subtracting said background signal component at said second height from said second signal component to generate said sonde error signal component.

9. The method of claim 8 wherein said second height is greater than said first height.

10. The method of claim 8 wherein said generating steps are conducted with said logging tool disposed above the earth in a region substantially free of metallic objects.

11. The method of claim 8 wherein said first signal component and said second signal component are real conductivity signals proportional to the ratio of receiver voltage to transmitter current where said voltage is one hundred eighty degrees out-of-phase with transmitter current, and said sonde error signal component is a real conductivity component.

12. The method of claim 8 wherein said first signal component and said second signal component are quadrature conductivity signals proportional to the ratio of receiver voltage to transmitter current where said voltage is ninety degrees out-of-phase with transmitter current, and said sonde error signal component is a quadrature conductivity signal.

13. The method of claim 8 wherein said measuring step is conducted with said induction logging tool disposed substantially parallel to the earth.

14. The method of claim 8 wherein said measuring step is conducted with said induction logging tool disposed substantially perpendicularly to the earth.

15. A method for determining a sonde error characteristic of an induction logging tool having a transmitter and a receiver, comprising the steps of
   disposing said logging tool above the earth in a region substantially free of metallic objects,
   measuring an electrical characteristic with said logging tool at two different heights above the earth,
   determining a difference characteristic between said electrical characteristics measured at said two different heights,
   determining a background component of the electrical characteristic measured at one of said heights by applying said difference characteristic to a predetermined functional relationship between said background component at said one height and said difference characteristic, and
   determining said sonde error characteristic by subtracting said background component of said electrical characteristic from said electrical characteristic measured at one of said two heights above the earth.

16. The method of claim 15 wherein said measuring step is conducted with said logging tool disposed substantially parallel to the earth,
said sonde error characteristic is the real conductivity error signal, and
said electrical characteristics measured at two different heights above the earth are real conductivity signals proportional to the ratio of receiver voltage to transmitter current where said voltage is one hundred eight degrees out-of-phase with said transmitter current.

17. The method of claim 15 wherein
said measuring step is conducted with said logging tool disposed substantially perpendicularly to the earth,
said sonde error characteristic is the real conductivity error signal, and
said electrical characteristics measured at two different heights above the earth are real conductivity signals proportional to the ratio of receiver voltage to transmitter current where said voltage is one hundred eighty degrees out-of-phase with said transmitter current.

18. The method of claim 15 wherein
said measuring step is conducted with said logging tool disposed substantially parallel to the earth,
said sonde error characteristic is a quadrature conductivity error signal, and
said electrical characteristic measured at two different heights above the earth are quadrature conductivity signals proportional to the ratio of receiver voltage to transmitter current where said voltage is ninety degrees out-of-phase with said transmitter current.

19. The method of claim 15 wherein said measuring step is conducted with said logging tool disposed substantially perpendicularly to the earth,
said sonde error characteristic is a quadrature conductivity error signal, and
said electrical characteristic measured at two different heights above the earth are quadrature conductivity signals proportional to the ratio of receiver voltage to transmitter current where said voltage is ninety degrees out-of-phase with said transmitter current.

* * * * *